US008675887B2

(12) United States Patent
Yuan et al.

(10) Patent No.: US 8,675,887 B2
(45) Date of Patent: Mar. 18, 2014

(54) WIRELESS ILLUMINATIVE SPEAKER SYSTEM AND WIRELESS ILLUMINATIVE SPEAKER THEREOF

(75) Inventors: Xiaotao Yuan, Shenzhen (CN); Qian Zhang, Shenzhen (CN); Hongyan Lu, Shenzhen (CN)

(73) Assignee: Shenzhen 3Nod Electronics Co., Ltd., Shenzhen, Guangdong (CN)

( * ) Notice: Subject to any disclaimer, the term of this patent is extended or adjusted under 35 U.S.C. 154(b) by 170 days.

(21) Appl. No.: 12/874,905

(22) Filed: Sep. 2, 2010

(65) Prior Publication Data

US 2011/0317846 A1 Dec. 29, 2011

(30) Foreign Application Priority Data

Jun. 23, 2010 (CN) .......................... 2010 1 0208872

(51) Int. Cl.
*H04B 3/00* (2006.01)
*H04R 5/02* (2006.01)

(52) U.S. Cl.
USPC ............................................. 381/77; 381/311

(58) Field of Classification Search
USPC ............ 381/77, 386, 387, 394, 311; 362/362, 362/235; 455/45, 41.2, 41.3, 66.1
See application file for complete search history.

(56) References Cited

U.S. PATENT DOCUMENTS

| | | | | |
|---|---|---|---|---|
| 8,150,460 | B1 * | 4/2012 | Curtis et al. | 455/557 |
| 2009/0008670 | A1 * | 1/2009 | Liu et al. | 257/99 |
| 2010/0322455 | A1 * | 12/2010 | Carlson | 381/387 |
| 2012/0155082 | A1 * | 6/2012 | Ramer et al. | 362/235 |

* cited by examiner

*Primary Examiner* — Xu Mei
*Assistant Examiner* — Ammar Hamid
(74) *Attorney, Agent, or Firm* — Morris Manning & Martin LLP; Tim Tingkang Xia, Esq.

(57) ABSTRACT

A wireless illuminative speaker system, comprising a wireless transmitter comprising a transmitter body, a wireless transmit module, a main board printed board circuit assembly (PCBA), and a support, and at least one wireless illuminative receiving speaker comprising a speaker body, an illuminating part, a speaker part, and a wireless receiving module. The wireless transmitter operates to obtain audio data from an external electronic device and to transmit the audio data in the form of wireless audio digital signals, the wireless transmit module is disposed in the transmitter body, the main board PCBA operates to control the wireless transmit module, the support operates to mount an audio playing device thereon, the wireless illuminative receiving speaker operates to receive the wireless audio digital signals from the wireless transmitter and to plays the received wireless audio digital signals after digital-to-analog conversion, and the illuminating part is disposed in the speaker body.

18 Claims, 9 Drawing Sheets

WIRELESS ILLUMINATIVE SPEAKER SYSTEM AND WIRELESS ILLUMINATIVE SPEAKER THEREOF

CROSS-REFERENCE TO RELATED APPLICATIONS

This application claims the benefit of Chinese Patent Application No. 201010208872.9 filed on Jun. 23, 2010. The disclosures of the above applications are incorporated herein by reference.

BACKGROUND OF THE INVENTION

1. Field of the Invention

The invention relates to a speaker system and a speaker, and more particularly to a wireless illuminative speaker system and a wireless illuminative speaker thereof.

2. Description of the Related Art

Wireless illuminative speaker system is widely used nowadays. However, there are several problems with the conventional wireless illuminative speaker system: firstly, remote controlling thereof cannot be implemented; secondly, it lack anti-interference capacity; and finally, installation thereof is inconvenient and thus application thereof is limited.

SUMMARY OF THE INVENTION

In view of the above-described problem, it is one objective of the invention to provide a wireless illuminative speaker system that is capable of addressing the above-mentioned problems.

It is another objective of the invention provides a wireless illuminative speaker that is capable of addressing the above-mentioned problems.

To achieve the above objectives, in accordance with one embodiment of the invention, provided is a wireless illuminative speaker system, comprising a wireless transmitter comprising a transmitter body, a wireless transmit module, a main board printed board circuit assembly (PCBA), and a support, and at least one wireless illuminative receiving speaker comprising a speaker body, an illuminating part, a speaker part, and a wireless receiving module. The wireless transmitter operates to obtain audio data from an external electronic device and to transmit the audio data in the form of wireless audio digital signals, the wireless transmit module is disposed in the transmitter body, the main board PCBA operates to control the wireless transmit module, the support operates to mount an audio playing device thereon, the wireless illuminative receiving speaker operates to receive the wireless audio digital signals from the wireless transmitter and to plays the received wireless audio digital signals after digital-to-analog conversion, and the illuminating part, the speaker part and the wireless receiving module are disposed in the speaker body.

In a class of this embodiment, the speaker body comprises a light guide lens, a sound transferring part, and a plastic shell with a speaker connector.

In a class of this embodiment, the speaker connector is a standard screw bulb base.

In a class of this embodiment, the illuminating part comprises a light emitting diode (LED) board and a heat sink, and the LED board is disposed on inner side of the light guide lens and fixedly connected to the heat sink.

In a class of this embodiment, the speaker part comprises a speaker driver and a sound tube, and the speaker driver, the sound tube, and the sound transferring part transmit and play audio signals.

In a class of this embodiment, the wireless illuminative receiving speaker further comprises an first PCBA and a second PCBA, the wireless receiving module transmits the wireless audio digital signals to the first PCBA for processing, and the first PCBA, the second PCBA, the speaker driver and the LED board are electrically connected to each other.

In a class of this embodiment, the LED board and the heat sink are fixed in the plastic shell, the speaker driver and the sound tube are fixed on the heat sink, the sound transferring part and the sound tube are connected to each other, and the first PCBA, the second PCBA, and the wireless receiving module are fixedly disposed in the plastic shell.

In a class of this embodiment, the wireless receiving module and the wireless transmit module use a transmit frequency of 2.4 GHz or 5.8 GHz etc.

In a class of this embodiment, the second PCBA is a built-in power supply with an input voltage ranging from 90 V to 245 V.

In a class of this embodiment, the LED board comprises an aluminum printed circuit board and at least one LED installed on the aluminum printed circuit board.

In a class of this embodiment, the transmitter body comprises a plastic top cover and a plastic bottom cover connected to each other, the support is fixed in the plastic top cover, a socket is disposed on the main board PCBA, and a infrared ray (IR) lens is disposed outside of the plastic bottom cover.

In a class of this embodiment, it further comprises a remote controller electrically connected to the wireless transmitter.

In accordance with one embodiment of the invention, provided is a wireless illuminative speaker, comprising: a speaker body comprising a light guide lens, a sound transferring part, a plastic shell with a speaker connector, an illuminating part comprising a light emitting diode (LED) board and a heat sink, a speaker part comprising a speaker driver and a sound tube, a first PCBA, a second PCBA, and a wireless receiving module. The illuminating part, the speaker part, the first PCBA, the second PCBA, the wireless receiving module are disposed in the speaker body, the wireless receiving module operates to receive wireless audio digital signals, the LED board is disposed on inner side of the light guide lens and fixedly connected to the heat sink, the speaker driver, the sound tube, and the sound transferring part transmit and play audio signals, the wireless receiving module transmits the wireless audio digital signals to the first PCBA for processing, and the first PCBA, the second PCBA, the speaker driver and the LED board are electrically connected to each other.

In a class of this embodiment, the LED board and the heat sink are fixed in the plastic shell, the speaker driver and the sound tube are fixed on the heat sink, the sound transferring part and the sound tube are connected to each other, and the first PCBA, the second PCBA, and the wireless receiving module are fixedly disposed in the plastic shell.

In a class of this embodiment, the speaker connector is a standard screw bulb base.

In a class of this embodiment, the wireless receiving module uses a receive frequency of 2.4 GHz or 5.8 GHz etc.

In a class of this embodiment, the second PCBA is a built-in power supply with an input voltage ranging from 90 V to 245 V.

In a class of this embodiment, the LED board comprises an aluminum printed circuit board and at least one LED installed on the aluminum printed circuit board.

Advantage of the invention comprise:

1. The illumination system is integrated into the speaker and the concurrent control of them is implemented, which saves cost and creates a better environment effect. Therefore, with the speaker system provided by the present invention, users not only enjoy this unique fashion in life but also enjoy an innovative and better digital audio experience. In addition, the users can enjoy music in kitchens, living rooms, bed rooms, bath rooms, coffee shops, and bars, even on planes or trains.

2. The invention comprises a wireless transmitter and a wireless receiving illuminative speaker. The wireless transmitter operates to receive audio signals and transmit them to the wireless receiving illuminative speaker via a wireless system. Using remote controller, a user can switch between the light and the speaker, between different songs, play/pause, fast forward, fast rewind, and adjusts volume and so on.

3. The wireless transmit module and the wireless receiving module use an anti-interference frequency of 2.4 GHz or 5.8 GHz etc. Furthermore, a transmission distance or a receiving distance thereof can reach 30 m (indoors) and 50-100 m (outdoors), or even longer. This enables the user to receive signals from the wireless transmitter in different places of a home without any obstacles.

4. The wireless transmitter supports different audio device by AUX input, and USB/SD memory card input. Therefore, the user can listen to his or her favorite music via a music mobile phone, a MP3 player, or a SD memory card.

5. A ceiling fixture that is replaceable is provided, and the speaker connector is a standard screw bulb base received in a universal lamp holder, and is convenient for installation and replacement. An input voltage is within a range of 90 to 245 V, and therefore users from different countries can use it.

BRIEF DESCRIPTION OF THE DRAWINGS

Detailed description will be given below in junction with accompanying drawings, in which.

Numeral reference: 1—light guide lens; 2—metal grill; 3—LED board; 4—sound tube; 5—heat sink; 6—speaker driver; 7—first PCBA; 8—wireless receiving module; 9—second PCBA; 10—plastic shell; 11—speaker connector; 12—adaptor; 13—support; 14—plastic top cover; 15—main board PCBA; 16—wireless transmit module; 17—plastic bottom cover; 18—IR lens; 19—screw bolt; 20—wireless transmitter; 30—wireless receiving illuminative speaker; 40—installation part; 50—extension part.

DETAILED DESCRIPTION OF THE INVENTION

For better understanding of various embodiments of the present invention, specific embodiments will be described as follows in combination with accompanying drawings.

Figure 1:
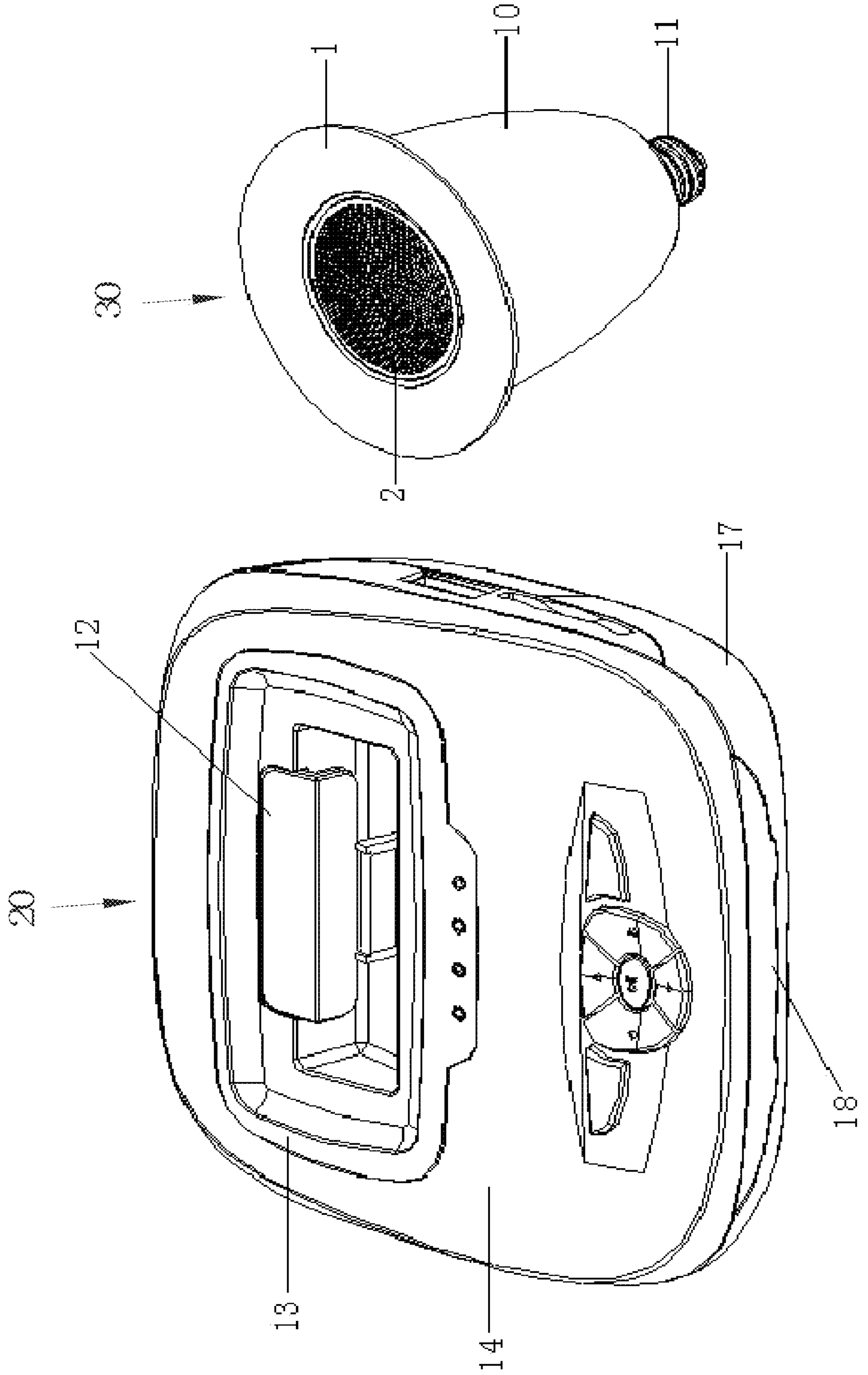
FIG. 1 is an overall schematic view of a wireless illuminative speaker of the invention.

FIG. 1 illustrates a wireless illuminative speaker system. The system comprises a wireless transmitter 20 and at least one wireless receiving illuminative speaker 30. The wireless transmitter 20 is connected to an external electronic device. The electronic device is a MP3 player, iPod, iPhone, or laptop, and can support audio input from AUX IN/USB/SD memory card whereby obtaining audio data therefrom. The electronic device transmits the wireless audio digital signals to the wireless receiving illuminative speaker 30 via an internal wireless transmit module so as to control the wireless receiving illuminative speaker 30 to play the audio. The wireless receiving illuminative speaker 30 comprises an illuminating part and a speaker part, and plays the music and provides illumination after receiving the signals transmitted by the wireless transmitter 20. The wireless transmitter 20 and the wireless receiving illuminative speaker 30 form a wireless illuminative speaker system.

Figure 2:
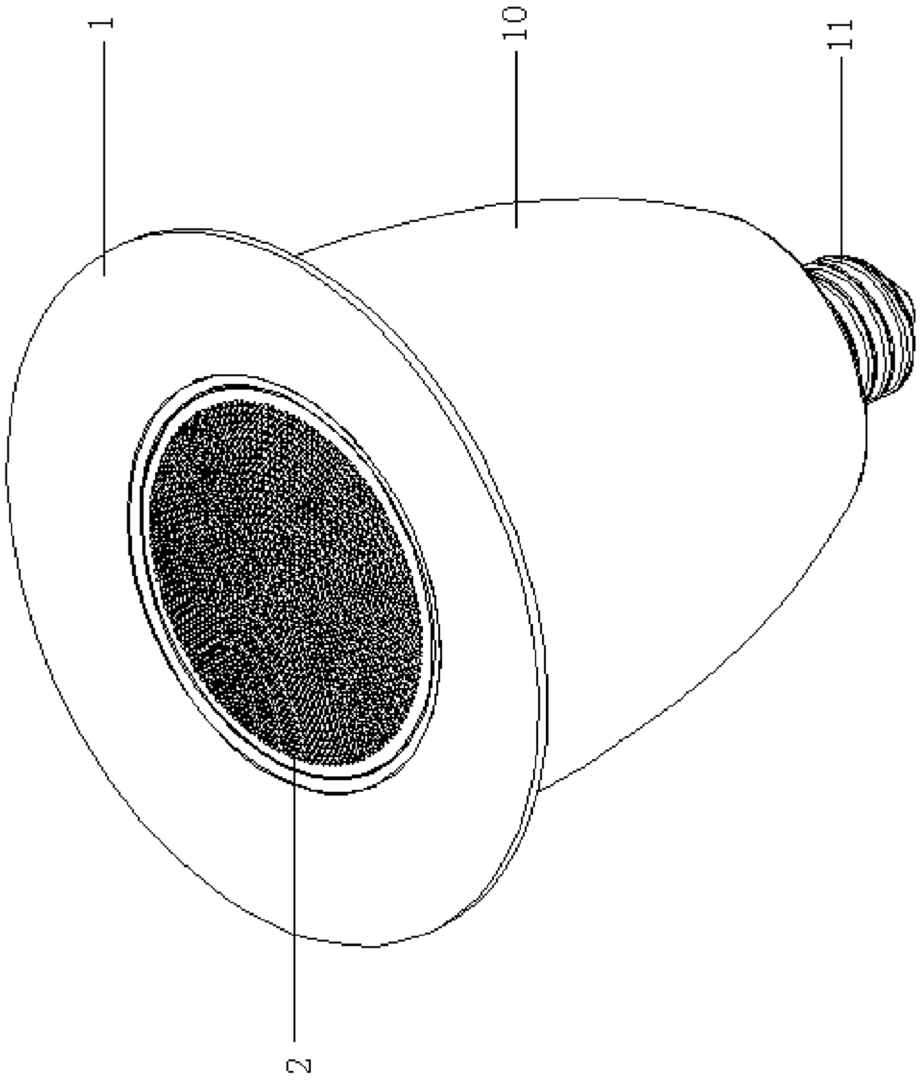
FIG. 2 is a schematic view of a wireless receiving illuminative speaker.
Figure 3:
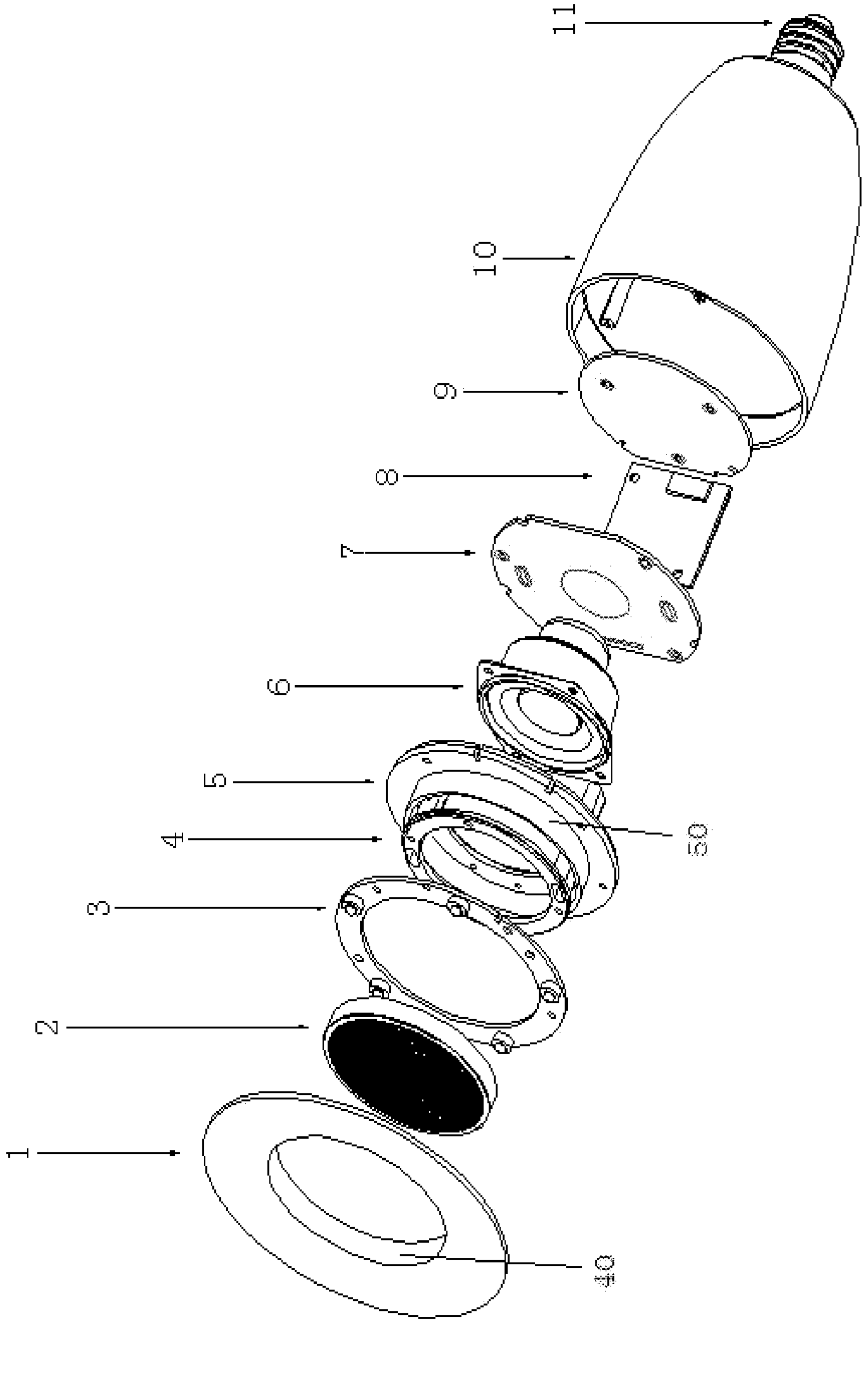
FIG. 3 is an explosive view of a wireless receiving illuminative speaker.
Figure 4:
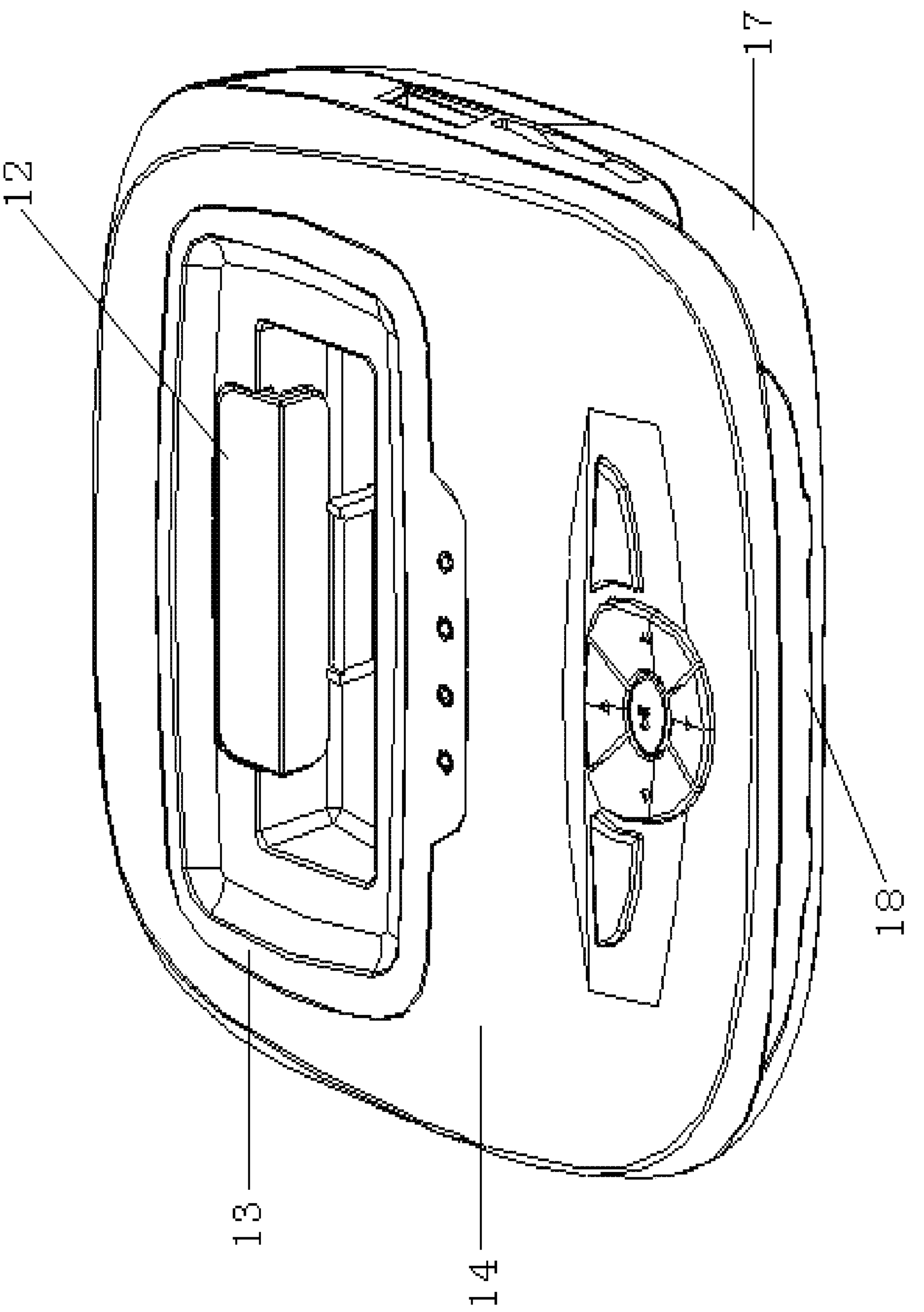
FIG. 4 is a schematic view of a wireless transmitter of the invention.
Figure 5:
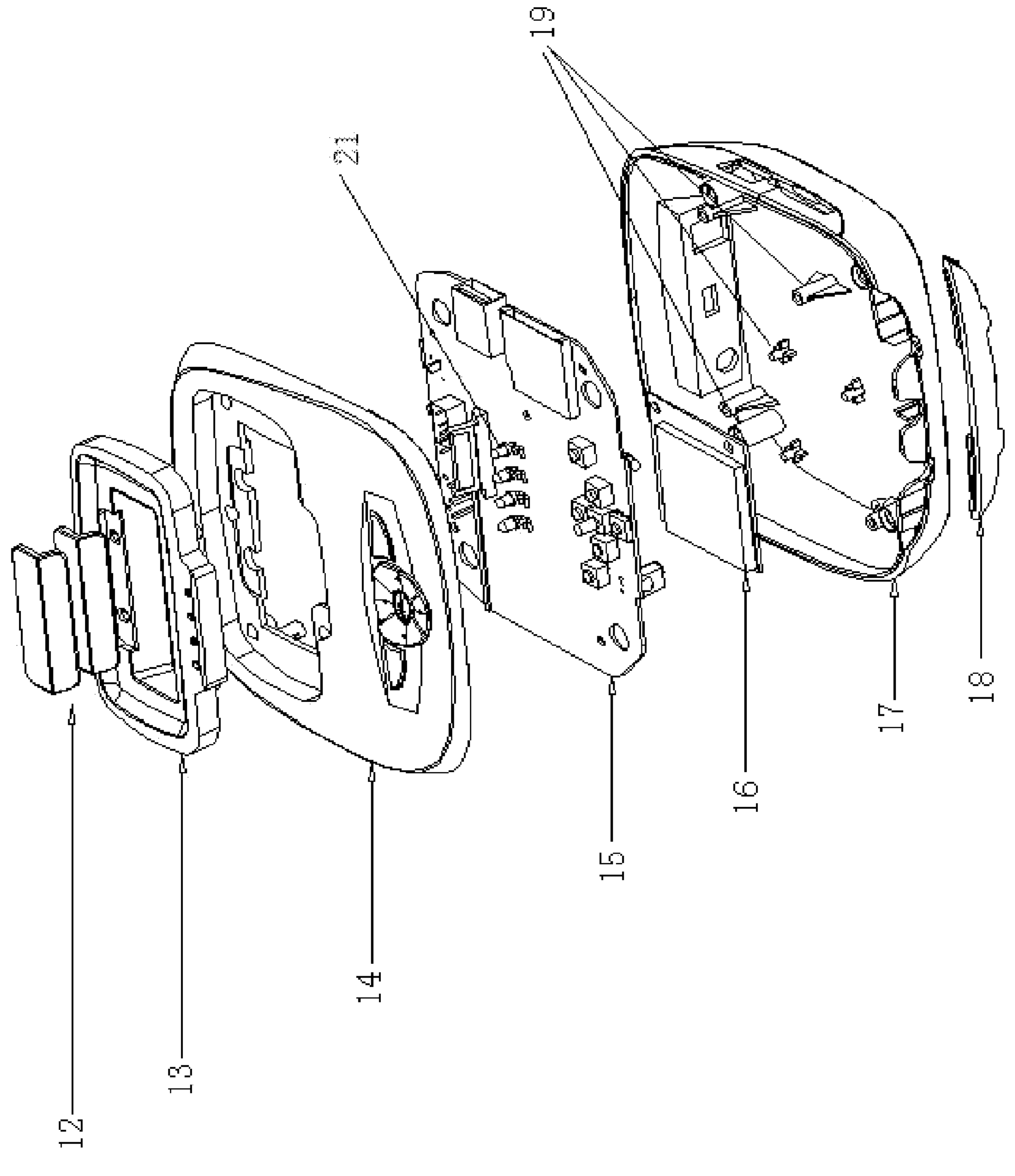
FIG. 5 is an explosive view of a wireless transmitter.

FIG. 2 illustrates a wireless receiving illuminative speaker 30. As shown in FIG. 3, internal structure of the speaker 30 is illustrated. From the outside of the speaker, a light guide lens 1, a sound transferring part 2, a plastic shell 10, and a speaker connector 11 are illustrated. In this embodiment, the sound transferring part 2 is a metal grill. In other embodiments, the sound transferring part 2 can be a plastic or metal component with through holes thereon, or even through holes are directly disposed on the light guide lens 1, with a fiber cloth on an outer layer thereof. As shown in FIG. 3, all components are connected in sequence.

The light guide lens 1, the metal grill 2, and the plastic shell 10 with the speaker connector 11 construct an external speaker body, an illuminating part and a speaker part are disposed in the speaker body. The speaker part comprises a speaker driver 6 and a sound tube 4.

The illuminating part comprises a LED board 3, and a heat sink 5. The LED board 3 is disposed on inner side of the light guide lens 1, and is fixedly connected to the heat sink 5. The LED board 3 and the heat sink 5 are fixed inner of the plastic shell 10.

The speaker part comprises the speaker driver 6 and the sound tube 4. The speaker driver 6 and the sound tube 4 are fixed on the heat sink 5. The metal grill 2 and the sound tube 4 are connected to each other, and disposed in a space formed by the light guide lens 1, the LED board 3, and the heat sink 5.

In embodiments of the present invention, the heat sink 5 comprises an extension part 50 extending from one side of the heat sink 5. The sound tube 4 and the metal grill 2 are fixedly disposed on inner side of the extension part 50 of the heat sink 5. The light guide lens 1 has an installation part 40 extending from one side of the light guide lens 1. The installation part 40 is fit on outer side of the extension part 50 of the heat sink 5. Therefore, the light guide lens 1 can be conveniently replaced by the LED board 3. In other embodiments of the invention, the installation part 40 of the light guide lens 1 can also be disposed on inner side or outer side of the plastic shell 10. The wireless receiving illuminative speaker 30 can be disposed in the ceiling fixture (not shown), and thus a pattern of the light guide lens 1 can be changed whereby match with the ceiling fixture in different size.

A first printed circuit board assembly (PCBA) 7, a wireless receiving module 8, and a second PCBA 9 are disposed in the speaker body. The wireless receiving module 8 transmits the received wireless audio signals to the first PCBA 7 for processing. The first PCBA 7, the second PCBA 9, the speaker driver 6, and the LED board 3 are electrically connected to each other.

The LED board 3 comprises an aluminum printed circuit board and at least one LED installed on the aluminum printed circuit board. In this embodiment, the light guide lens 1, the LED board 3, and the heat sink 5 are all ring-shaped, and annularly disposed on outer side of the metal grill 2 and the sound tube 4. The ring-shaped structure ensures secure fixation between them and other components, and leaves sufficient space for installing the metal grill 2. In other embodiments, the light guide lens 1, the LED board 3, and the heat sink 5 can be strip-shaped. The sound transferring part 2 (metal grill) and the speaker part are designed to have shapes and structure matching with the light guide lens 1, the LED board 3, and the heat sink 5.

Screws and screw holes are disposed on the LED board 3 and connected to the heat sink 5. The sound tube 4 is fixed on one side of the heat sink 5, and the other side thereof is connected to the speaker driver 6 via at least two screws. The wireless receiving module 8 receives the wireless audio signals from the wireless transmitter 20, transmits the signals to the first PCBA 7 for processing, and plays music via the speaker driver 6.

Preferably, the wireless receiving module 8 uses a frequency of 2.4 GHz or 5.8 GHz etc. In other embodiments, the wireless receiving module 8 can also use the Bluetooth or WiFi for wireless transmission.

The second PCBA 9 is a built-in switch power supply electrically connected to the speaker connector 11 whereby controlling a power output and providing power for other components of the wireless receiving illuminative speaker 30 and the LED. A range of the input voltage is 90 to 245 V, which adapts to a voltage requirement in different countries and regions.

The size of the plastic shell 10 can be adjusted to match with ceiling fixtures in different size. The speaker connector 11 is a standard screw bulb base, and received in the universal lamp holder after being screwed down, which is convenient for installation and replacement. In addition, the LED board 3 comprises an aluminum printed circuit board and surface mount device (SMD) LEDs with high efficiency and low energy consumption. An input voltage range of the wireless receiving illuminative speaker is 90 to 245 V. Illumination power of each speaker is 5 Watts. Packaging of the LEDs of 5 Watts consumes power of 50-60 Watts of a traditional bulb. Illumination power of each wireless receiving illuminative speaker is 5 Watts and the music power (RMS) of each speaker is 10 Watts. The first PCBA 7, the second PCBA 9, and the wireless receiving module 8 are fixed in the plastic shell 10 via screws.

FIGS. 4-9 illustrate a wireless transmitter 20. As shown in the explosive view in FIG. 5, a transmitter body of the wireless transmitter 20 comprises a plastic top cover 14 and a plastic bottom cover 17.

A main board PCBA 15 and a wireless transmit module 16 are disposed in the body of the wireless transmitter 20. Multiple screw holes are disposed on the main board PCBA 15, and fixedly connected to the screw bolts 19 in the plastic bottom cover 17. The main board PCBA 15 is for controlling all components of the wireless transmitter 20, converting the audio signals from the iPod, iPhone, or AUX IN via an analog to digital converter (ADC), and transmitting the signals in the format of wireless digital audio signals via the wireless transmit module 16. At the same time, a micro controller unit (MCU) on the main board PCBA 15 controls the ADC and the wireless transmit module 16 via a serial peripheral interface (SPI). The wireless transmit module 16 is fixed in the plastic bottom cover 17, and is operated to transmit wireless signals to the wireless receiving illuminative speaker 30. Preferably, the wireless transmit module 16 uses an anti-interference frequency of 2.4 GHz or 5.8 GHz etc. Furthermore, a transmission or receiving distance can reach 30 m (indoors) and 50-100 m (outdoors), or even further. In other embodiments, the wireless receiving module can also use the Bluetooth or WiFi for wireless transmission, which enables users to receive signals from the wireless transmitter 20 in different places of a house without any obstacles.

A support 13 is fixed in the plastic top cover 14 and is operated to mount an audio device. In this embodiment, the audio device is an iPod/iPhone, a music mobile phone or a MP3 player. An adaptor 12 is disposed on the support 13, and is operated to prevent dusts and foreign bodies from damaging a 30-pin socket 21. The socket 21 is disposed in the wireless transmitter and on the main board PCBA 15, and operates to play music stored in the iPod or iPhone, and to charge them at a current of 500 mA or 1000 mA.

Figure 6:
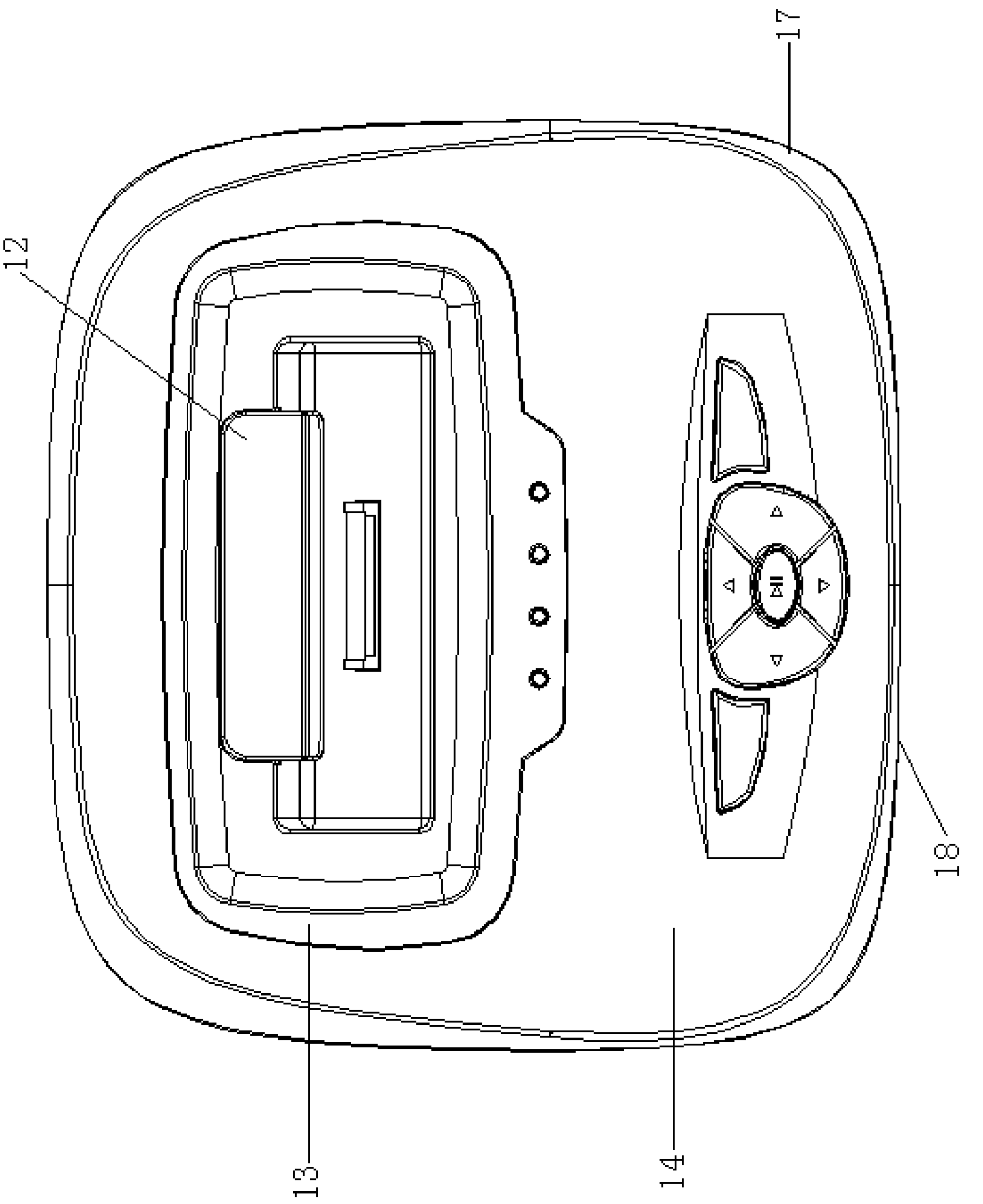
FIG. 6 is a perspective view of a wireless transmitter.

As shown in FIG. 6, multiple buttons and indicators, comprising iPod/iPhone, SD, USB, and AUX indicators, and ON/OFF, SOURCE, PLAY/PLAY/PAUSE, and fast-forward and fast-backward keys, are disposed on the shell of the wireless transmitter, and enable the user to perform control, such as fast forward, fast rewind, play, play/pause, switch-on/off of the power, and volume controlling. In addition, the wireless transmitter is equipped with a remote controller (not shown), the user can transmit related commands to the wireless transmitter whereby implementing the above-mentioned functions via the remote controller.

Figure 7:
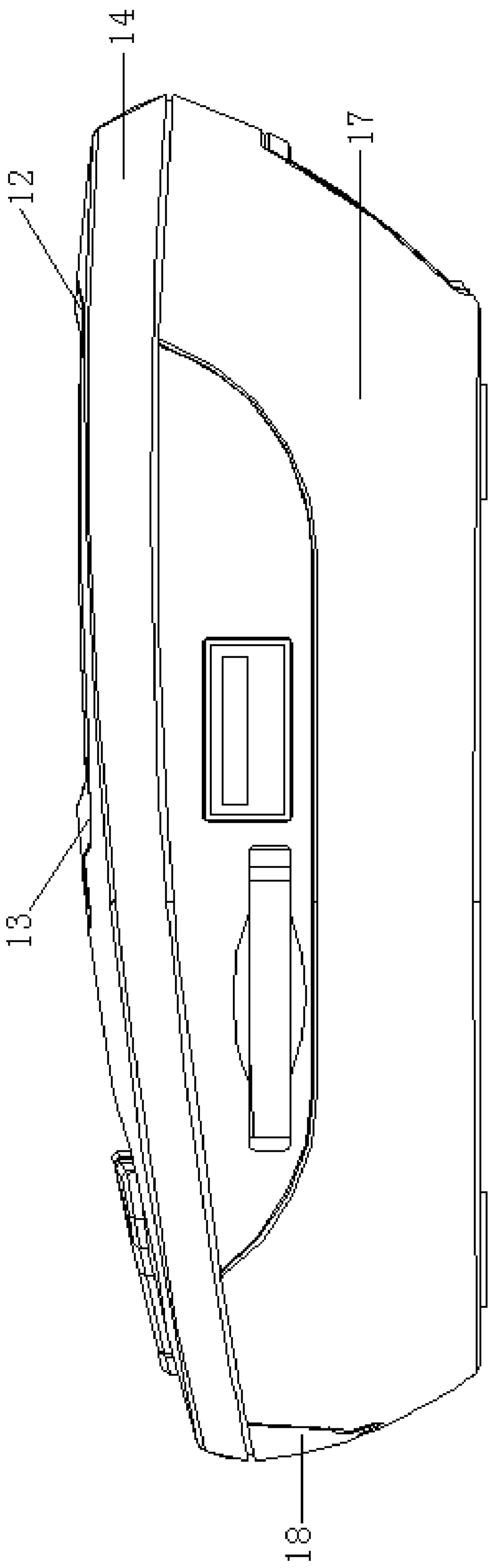
FIG. 7 is a right side view of a wireless transmitter.
Figure 8:
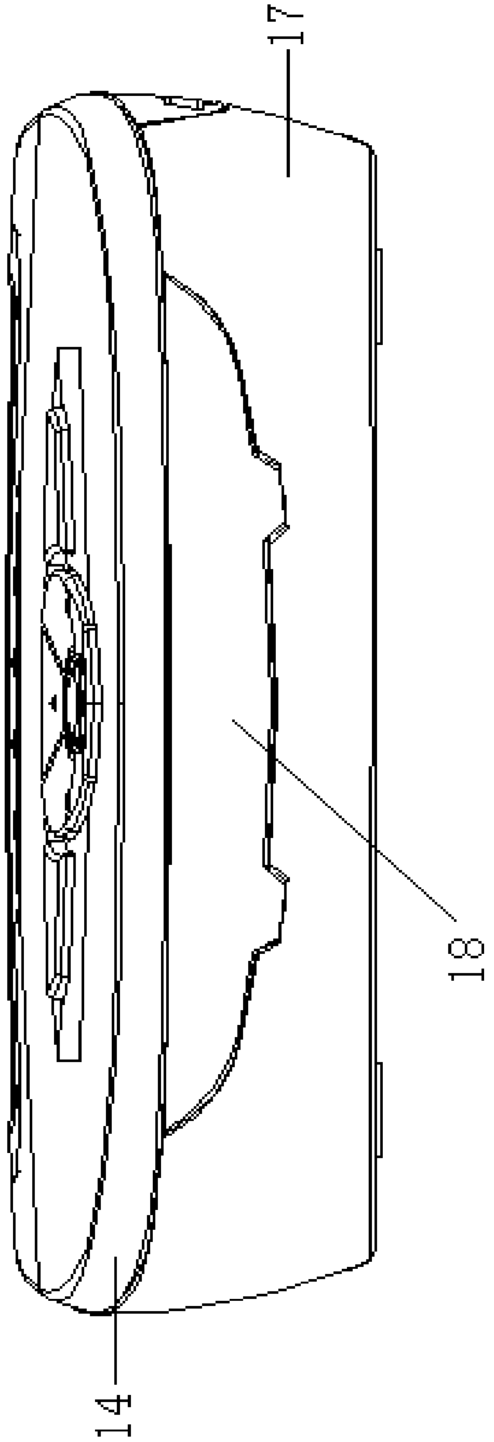
FIG. 8 is a front view of a wireless transmitter.
Figure 9:
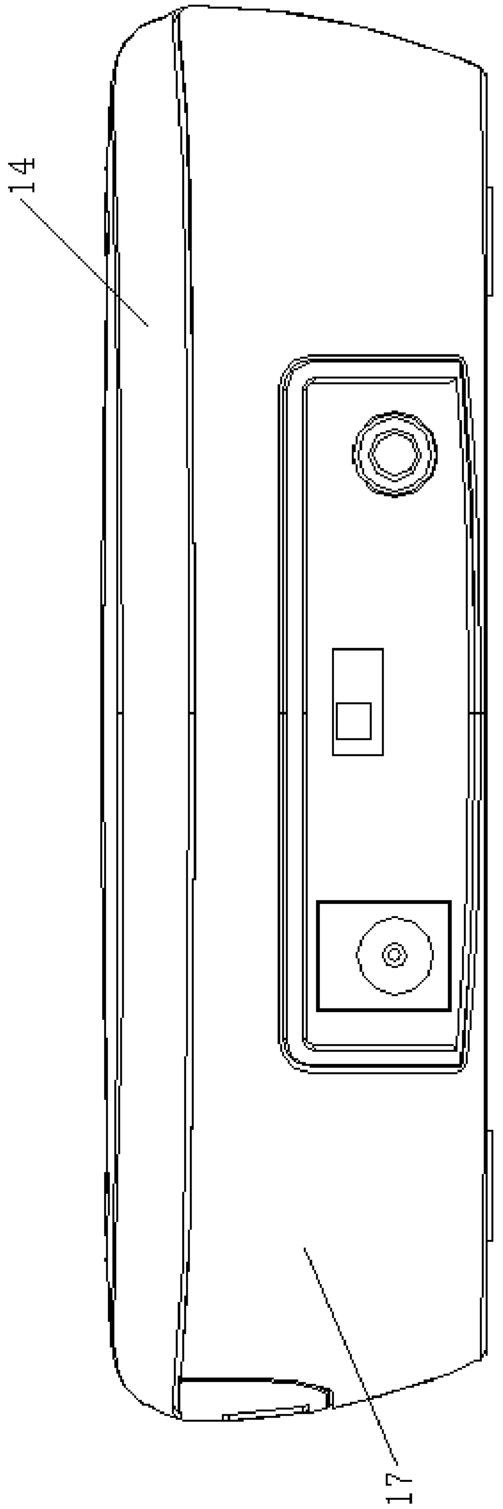
FIG. 9 is a rear view of a wireless transmitter.

As shown in FIGS. 7-9, an infrared ray (IR) lens 18 is disposed outside of the plastic bottom cover 17, and audio input jacks such as AUX IN, USB, and SD memory card are also disposed on sides and back of the plastic bottom cover 17.

The wireless illuminative speakers 30 can be installed on ceilings, walls, or other private places in kitchens, living rooms, bed rooms, bath rooms, bars, and restaurants, or even on desk lamps, vertical lamps, trains, or planes for playing music. In the embodiment, one wireless transmitter can control at least one to eight wireless receiving illuminative speakers. In other embodiments, one wireless transmitter maybe control more wireless receiving illuminative speakers.

Wireless transmission is implemented between the wireless transmitter and the wireless receiving illuminative speaker enables users to freely control the wireless illuminative speaker system without interference of geographic positions. The wireless transmitter and the wireless receiving illuminative speaker use the wireless transmit module and wireless receiving module operating at 2.4 GHz or 5.8 GHz etc. In addition, a dynamic frequency analysis algorithm is used for wireless transmission and receiving. Continuous scanning and self-adaptive frequency selection algorithm quickly changes a frequency to prevent in-band interference, to implement seamless handover, and to improve anti-interference capability. Further, the complex forward error correction (FEC) is used to restore lost data, and data packet retransmission protocols are used to ensure continuous play of high-definition audio. At the same time, the dynamic power control algorithm is used for the radio frequency (RF) power to adjust the RF transmit power according to the distance, and thus saving energy and reducing interferences to accommodate the complicated working environment. The wireless transmitter and the wireless receiving illuminative speaker use an anti-interference frequency of 2.4 GHz or 5.8 GHz etc. Furthermore, a transmission or receiving distance can reach 30 m (indoors) and 50-100 m outdoors, or even longer. This enables the user to receive signals from the wireless transmitter in different places of his/her home without any obstacles. When the user moves from one room to another room, the speaker can be flexibly switched and the music can be smoothly switched from one speaker to another speaker, and thus implementing continuity of the music and illumination, and simultaneous operation of speakers in different rooms. In addition, the wireless transmitter is also equipped with a remote controller. Using the remote controller, users can switch the light and sound, and status of songs such as play/pause, FF, REW, and volume tuning, without moving around.

The wireless transmit module uses a frequency of 2.4 GHz or 5.8 GHz etc., a high-efficient LED on the aluminum printed circuit board, and a high quality full-range speaker driver, whereby forming an innovative wireless illuminative speaker system, and providing the user with a colorful life and excellent audio and visual experience.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What is claimed is:

1. A wireless illuminative speaker system, comprising:

a wireless transmitter comprising a transmitter body, a wireless transmit module, a main board printed board circuit assembly (PCBA), and a support; and at least one wireless illuminative receiving speaker comprising a speaker body, an illuminating part, a speaker part, and a wireless receiving module;

wherein said wireless transmitter operates to obtain audio data from an external electronic device and to transmit said audio data in the form of wireless audio digital signals;

said wireless transmit module is disposed in said transmitter body;

said main board PCBA operates to control said wireless transmit module;

said support operates to mount an audio playing device thereon;

said wireless illuminative receiving speaker operates to receive said wireless audio digital signals from said wireless transmitter and to play said received wireless audio digital signals after digital-to-analog conversion;

said speaker body comprises a ring-shaped light guide lens, a round sound transferring part, and a plastic shell with a speaker connector;

said illuminating part comprises a ring-shaped light emitting diode (LED) board and a ring-shaped heat sink for dissipating heat generated by the LED board;

said speaker part comprises a round speaker driver and a round sound tube;

said LED board is disposed on inner side of said light guide lens and having a top surface facing said light guide lens and an opposite, bottom surface facing said heat sink, wherein said bottom surface of said LED board is completely fixedly connected to said heat sink, and wherein said LED board has a plurality of LED lamps disposed on said top surface of said LED board; and said illuminating part, said speaker part, and said wireless receiving module are disposed in said speaker body such that said light guide lens, said sound transferring part, said LED board, said sound tube, said heat sink, said speaker driver, and said wireless receiving module are assembled sequentially and completely disposed inside the containing space enclosed by said ring-shaped light guide lens, said round sound transferring part, and said plastic shell.

2. The system according to claim 1, wherein said speaker connector is a standard screw bulb base.

3. The system according to claim 1, wherein said speaker driver, said sound tub, and said sound transferring part transmit and play audio signals.

4. The system according to claim 3, wherein said wireless illuminative receiving speaker further comprises a first PCBA and a second PCBA;

said wireless receiving module transmits said wireless audio digital signals to said first PCBA for processing; and said first PCBA, said second PCBA, said speaker driver and said LED board are electrically connected to each other.

5. The system according to claim 4, wherein said LED board and said heat sink are fixed in said plastic shell;

said speaker driver and said sound tube are fixed on said heat sink;

said sound transferring part and said sound tube are connected to each other; and said first PCBA, said second PCBA, and said wireless receiving module are fixedly disposed in said plastic shell.

6. The system according to claim 5, wherein said wireless receiving module and said wireless transmit module use a transmit frequency of 2.4 GHz or 5.8 GHz etc.

7. The system according to claim 6, wherein said second PCBA is a built-in power supply with an input voltage ranging from 90 V to 245 V.

8. The system according to claim 7, wherein said LED board comprises an aluminum printed circuit board and at least one LED installed on said aluminum printed circuit board.

9. The system according to claim 8, wherein said transmitter body comprises a plastic top cover and a plastic bottom cover connected to each other;

said support is fixed in said plastic top cover;

a socket is disposed on the main board PCBA; and a infrared ray (IR) lens is disposed outside of said plastic bottom cover.

10. The system according to claim 1, further comprising a remote controller is for controlling said wireless transmitter.

11. A wireless illuminative speaker, comprising:

a speaker body comprising a ring-shaped light guide lens, a round sound transferring part, a plastic shell with a speaker connector;

an illuminating part comprising a ring-shaped light emitting diode (LED) board and a ring-shaped heat sink for dissipating heat generated by the LED board;

a speaker part comprising a speaker driver and a sound tube;

a first PCBA;

a second PCBA; and a wireless receiving module;

wherein said wireless receiving module operates to receive wireless audio digital signals;

said LED board is disposed on inner side of said light guide lens and having a top surface facing said light guide lens and an opposite, bottom surface facing said heat sink, wherein said bottom surface of said LED board is completely fixedly connected to said heat sink, and wherein said LED board has a plurality of LED lamps disposed on said top surface of said LED board;

said speaker driver, said sound tube, and said sound transferring part transmit and play audio signals;

said wireless receiving module transmits said wireless audio digital signals to said first PCBA for processing;

said first PCBA, said second PCBA, said speaker driver and said LED board are electrically connected to each other, and said illuminating part, said speaker part, said first PCBA, said wireless receiving module and said second PCBA are disposed in said speaker body, such that said light guide lens, said sound transferring part, said LED board, said heat sink, said speaker driver, said first PCBA, said wireless receiving module, and said second PCBA are assembled sequentially and completely disposed inside the containing space enclosed by said ring-shaped light guide lens, said round sound transferring part, and said plastic shell.

12. The wireless illuminative speaker according to claim 11, wherein said LED board and said heat sink are fixed in said plastic shell;

said speaker driver and said sound tube are fixed on said heat sink;

said sound transferring part and said sound tube are connected to each other; and said first PCBA, said second PCBA, and said wireless receiving module are fixedly disposed in said plastic shell.

13. The wireless illuminative speaker according to claim 12, wherein said speaker connector is a standard screw bulb base.

14. The wireless illuminative speaker according to claim 13, wherein said wireless receiving module uses a receive frequency of 2.4 GHz or 5.8 GHz.

15. The wireless illuminative speaker according to claim 14, wherein said second PCBA is a built-in power supply with an input voltage range from 90 V to 245 V.

16. The wireless illuminative speaker according to claim 15, wherein said LED board comprises an aluminum printed circuit board and at least one LED installed on said aluminum printed circuit board.

17. The system according to claim 5, wherein each of said light guide lens, said sound transferring part, said LED board, said sound tube and said heat sink, said speaker driver, said first PCBA, said second PCBA, and said wireless receiving module is replaceable.

18. The wireless illuminative speaker according to claim 12, wherein each of said light guide lens, said sound transferring part, said LED board, said sound tube and said heat sink, said speaker driver, said first PCBA, said second PCBA, and said wireless receiving module is replaceable.

* * * * *